(12) United States Patent
Bog et al.

(10) Patent No.: US 6,434,150 B1
(45) Date of Patent: *Aug. 13, 2002

(54) TELECOMMUNICATIONS PROVIDER AGENT

(75) Inventors: Abdullah Murat Bog, Milpitas, CA (US); Steven Turner, Overland Park, KS (US); Matthew Kung-Wei Jonathan Barrow, Kansas City, MO (US); Tracey Mark Bernath, Leawood, KS (US)

(73) Assignee: Sprint Communications Company, L.P., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/129,268

(22) Filed: Aug. 5, 1998

(51) Int. Cl.⁷ .............................. H04L 12/56; H04J 3/12
(52) U.S. Cl. ..................................... 370/395.1; 370/522
(58) Field of Search ................................. 370/389, 392, 370/395.1, 395.21, 395.3, 395.52, 395.6, 395.7, 399, 400, 525, 526

(56) References Cited

U.S. PATENT DOCUMENTS 5,978,451 A * 11/1999 Swan et al. .............. 379/88.24
6,141,339 A * 10/2000 Kaplan et al. ............. 370/352
6,229,803 B1 * 5/2001 Bog et al. ................. 370/352

* cited by examiner

Primary Examiner—Huy D. Vu
Assistant Examiner—Toan Nguyen
(74) Attorney, Agent, or Firm—Harley R. Ball; Steven J. Funk; Kevin D. Rogg

(57) ABSTRACT

The invention is a provider agent product and method that operates as a software interface between an telephony hub and a session manager in an advanced communications network. The provider agent receives event messages from the telephony hub indicating on-hook events, off-hook events, and digit events. The provider agent instructs the telephony hub to provide dial tone, ring current, ringback, and busy signals to the telephones. The provider agent also exchanges messages with a session manager in the network. These messages include: invite messages, reply messages, join messages, confirm messages, and terminate messages. In response to the above processing, the provider agent instructs the telephony hub to interwork telephony signals on a telephony channel with ATM signals on an ATM virtual channel. The provider agent is comprised of a plurality of software objects that are stored on a software storage medium and that include: a controller object, port objects, and event objects. The provider agent objects are executed by a multithreaded processing system and each object has a separate processing thread. The provider agent and the telephony hub communicate through an application programming interface that is specified in an Interface Definition Language (IDL) of a Common Object Request Broker Architecture (CORBA).

20 Claims, 7 Drawing Sheets

TELECOMMUNICATIONS PROVIDER AGENT

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The invention is related to the field of telecommunications, and in particular, to a software interface product and method utilized between an telephony hub and a digital communications network.

2. Background

Advanced communications networks are being developed to support a vast array of communications services. These networks are controlled by complex hardware and software platforms referred to as session managers. Users requiring communications sessions from these advanced networks must interface with the session managers to request and receive communications services. Session managers operate using various messages, such as invite messages, reply messages, confirm messages, join messages, and terminate messages.

A class 5 telephone switch communicates with an analog telephone using the analog telephony signals in the well-known analog telephony format. The class 5 telephone switch provides power to the telephone. The class 5 telephone switch detects off-hook current caused by the telephone and provides the telephone with dial tone. The caller generates Dual-Tone Multi-Frequency (DTMF) signals. The class 5 telephone switch detects the DTMF signals and initiates the call in the network. When the far-end telephone is ringing, the class 5 telephone switch plays a ringback tone to the caller. If the far-end telephone is busy, the class 5 telephone switch plays a busy tone to the caller. On incoming calls, the class 5 telephone switch provides ring current to the telephone.

Telephony hubs are being developed to manage multiple telephones. The telephony hubs are typically located in a residential area, and the telephone lines from multiple residences are connected to the telephony hub. These telephone lines are known as local loops. Digital Line Carrier (DLC) equipment may be used between the telephones and the telephony hub. The telephony hubs connect the telephones in the home to a network element in the advanced communications network. This connection between the telephony hub and the network element is typically an Asynchronous Transfer Mode (ATM) connection to an ATM device. ATM signals do not traditionally support analog telephony signals, such as off-hook, dial tone, and busy signals. The telephony hubs detect off-hook conditions, on-hook conditions, and digits. In addition, the telephony hubs provide the telephones with dial tone, ring current, ringback, and busy signals.

At present, there is not an acceptable software interface for use between the telephony hub and the session manager in the network. There is a need for software that can provide an interface between the telephony hub and the session manager.

SUMMARY

The invention overcomes these problems with a provider agent that operates as a software interface between the telephony hub and the session manager. The provider agent allows users to obtain conventional telephone service from an advanced broadband network. The provider agent is comprised of software objects that are stored on a software storage medium.

In some embodiments, the provider agent is comprised of a plurality of objects including a controller object, port objects, and event objects. The provider agent is executed by a multithreaded processing system and these objects each have a separate processing thread. The provider agent and the telephony hub communicate through an Application Programming Interface (API). In some embodiments, the API is specified in the Interface Definition Language (IDL) of the Common Object Request Broker Architecture (CORBA)

The invention includes a provider agent software interface for use between an telephony hub and a session manager. The telephony hub is operational to interwork between analog telephony signals over a plurality of channels and ATM signals over a plurality of ATM virtual connections in response to interwork instructions. The telephony hub is operational to detect on-hook events, off-hook events, and digit events and to provide event messages. The telephony hub is operational to provide dial tone, ringback, and busy signals in response to tone instructions. The session manager is operational to transmit and receive invite messages, reply messages, join messages, and terminate messages.

The provider agent receives an off-hook event message for a channel from the telephony hub, and in response, transmits a dial tone instruction for the channel to the telephony hub. The provider agent receives a plurality of digit event messages for the channel from the telephony hub, and in response, transmits an invite message indicating a dialed number for the channel to the session manager. The provider agent receives a reply message for the channel from the session manager indicating an alerting condition, and in response, transmits a ringback tone instruction for the channel to the telephony hub. The provider agent receives a join message for the first channel from the session manager, and in response, transmits an add stream message for the first channel to the session manager. The provider agent receives a confirm message for the first channel from the session manager, and in response, transmits a first interwork instruction for the first channel to the telephony hub to interwork a telephony signal on the channel with an ATM signal on a selected virtual channel for the channel. The provider agent repeats the above-described operations for at least 100 additional channels.

In some embodiments of the invention, the provider agent transmits a second interwork instruction for the channel to the telephony hub to stop interworking the channel and the selected virtual channel. The provider agent receives another invite message for the channel from the session manager, and in response, determines that the invite message is associated with the channel, transmits a ring instruction for the channel to the telephony hub, and transmits another reply message indicating an alerting condition for the channel to the session manager. The provider agent receives an off-hook event message for the channel from the telephony hub, and in response, transmits another join message for the channel to the session manager. The provider agent receives a join stream message for the channel from the session manager, and in response, transmits a reference information message for the channel to the session manager. The provider agent receives a confirm message for the channel from the session manager, and in response, transmits a third interwork instruction for the channel to the telephony hub to interwork another telephony signal on the channel with another ATM signal on another selected virtual channel for the channel. The provider agent can concurrently perform the above-described operations for at least 100 additional channels.

In some embodiments of the invention, the provider agent receives an on-hook event message for the channel from the telephony hub, and in response, transmits a terminate message for the channel to the session manager and transmitting the second interwork instruction for the channel. In other embodiments of the invention, the provider agent receives a termination message for the channel from the session manager, and in response, transmits the second interwork instruction for the channel.

DETAILED DESCRIPTION

Figure 1:
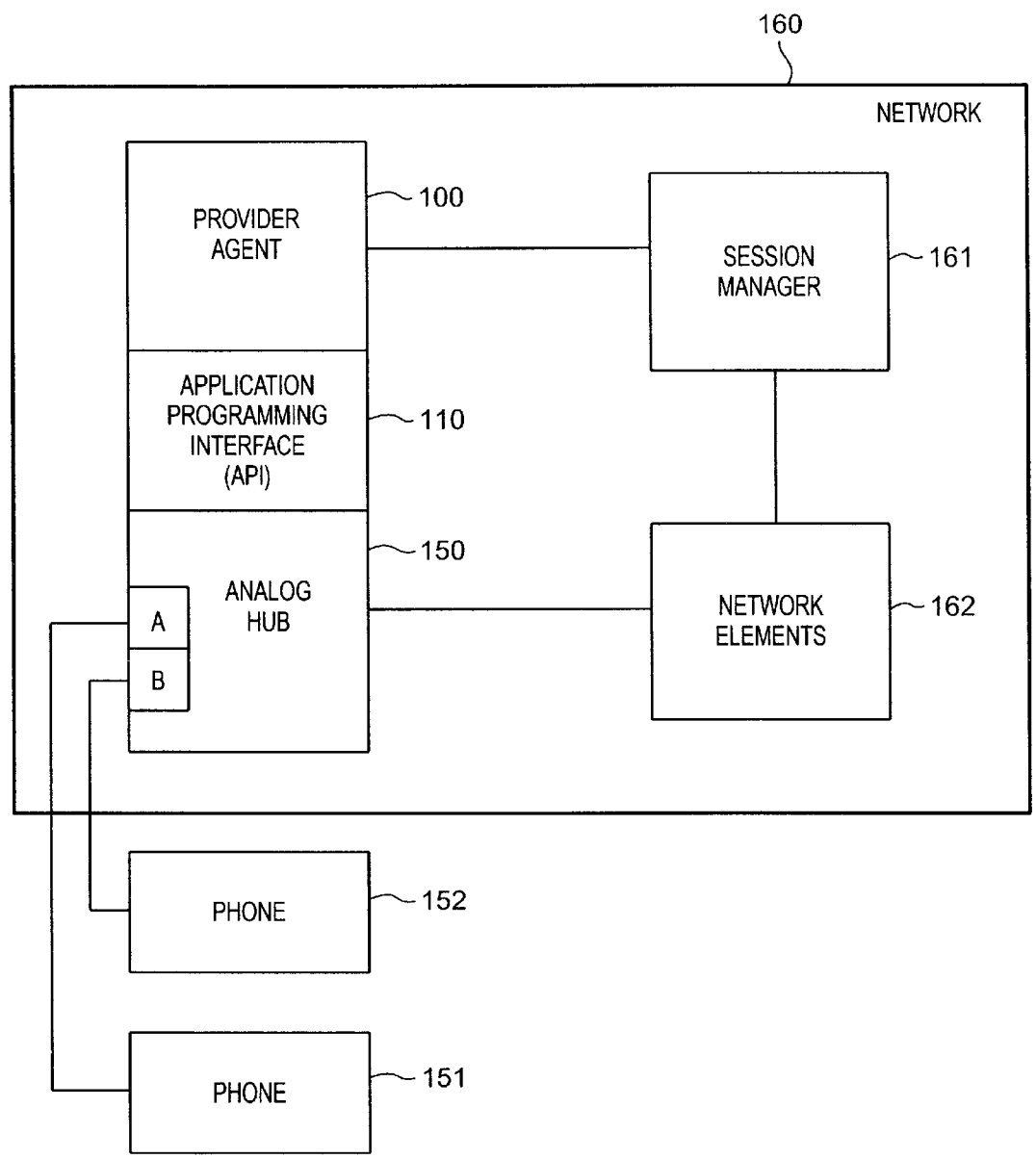
FIG. 1 is a block diagram of a system architecture in some examples of the invention.

System Architecture—FIG. 1

FIG. 1 depicts one example of a system architecture in block diagram form. A network 160 is comprised of: provider agent 100, API 110, telephony hub 150, session manager 161, and network elements 162. The provider agent 100 is coupled to the Application Programming Interface (API) 110. The API 110 is coupled to the telephony hub 150. The telephony hub 150 is connected to phones 151–152 over channels A and B respectively. The provider agent 100 is coupled with the session manager 161. The telephony hub 150 is connected to the network elements 162.

The network elements 162 provide digital communications services to the telephony hub 150. Some examples of network elements 162 are ATM switches and multiplexers, Digital Subscriber Line (DSL) equipment, Internet Protocol (IP) routers and servers, and enhanced services platforms. The session manager 161 controls the set-up and delivery of communications services in the network 160. The session manager 161 receives user service requests and invokes the desired services through network elements 162.

Version 0.8 of the "Retailer Reference Point Specification" issued by the Telecommunication Information Network Architecture Consortium (TINA-C) specifies the session manager 161, the connection between the session manager 161 and the provider agent 100, and the messages exchanged between the session manager 161 and the provider agent 100. The interface between the session manager 161 and the provider agent 100 is defined by the TINA-C Retailer Reference Point Specification and is compiled into CORBA IDL. The interface transport is via Transaction Control Protocol/Internet Protocol (TCP/IP) using Logic Link Control/Sub-Network Access Protocol (LLC/SNAP) encapsulation and ATM Adaptation Layer 5 (AAL5) to provide Permanent Virtual Connection (PVC) connectivity.

The telephony hub 150 includes channels for the phones 151–152 and a broadband interface to the network elements 162. In some embodiments of the invention, the channels to the phones 151–152 are local loop ports, and the interface to the network elements 162 is a ATM/SONET port. The telephony hub 150 includes circuitry to interwork telephony signals from the phones 151–152 with broadband signals to the network 160. Typically, the telephony signals are analog, but in some embodiments, the telephony signals are digital line carrier signals. One example of a broadband signal is an ATM/SONET signal.

The telephony hub 150 includes circuitry that generates dial tones, ring-back tones, busy tones, fast-busy tones, and ring current for the phones 150–151. The telephony hub 150 includes circuitry that detects Dual Tone Multi-Frequency (DTMF) digit events, off-hook events, and on-hook events, and that provides messages indicating these events. The telephony hub 150 also includes software control systems that control the circuitry and interface with the API 110. The telephony hub 150 could be adapted from the LDR-2000 supplied by Yurie Systems.

The phones 151–152 represent any communications devices supported by the telephony hub 150. Some examples are conventional analog telephones, computers, modems, and fax machines. Only two channels with one phone each is shown for the sake of clarity. Typically there are approximately 200 channels on an telephony hub, and multiple phones can be connected to each channel.

Those skilled in the art are familiar with the telephony hub 150 and the network 160. A description of these elements is found in co-pending U.S. patent application Ser. No. 08/826,641, entitled "Telecommunications System", filed on Apr. 7, 1997, assigned to the same entity as this Patent Application, and that is hereby incorporated by reference into this Patent Application. A description of these elements is found in co-pending United States Patent Application entitled "Asynchronous Transfer Mode System for Providing Telephony Service", docket 1178 filed on the same date as this Patent Application, assigned to the same entity as this Patent Application, and that is hereby incorporated by reference into this Patent Application.

The API 110 is a software interface that exchanges event messages and instructions between the telephony hub 150 and the provider agent 100. The provider agent 100 accepts event messages from the telephony hub 150 through the API 110 and provides instructions back to the telephony hub 150. For example, the provider agent 100 might receive information through the API 110 that the phone 151 has gone off-hook. In response, the provider agent 100 might provide a control instruction through the API 110 to the telephony hub 150 to provide dial tone to the phone 151. In some embodiments of the invention, the API 110 is specified in CORBA IDL.

The provider agent 100 responds to event messages for the phones 151–152 with instructions for the telephony hub 150 to interact with the user. User interaction includes dial tone, digit collection, ring, ringback, and busy signals. The provider agent 100 also exchanges messaging with the session manager 161. Messages include invite messages, reply messages, join messages, confirm messages, and terminate messages.

Both the provider agent 100 and the API 110 are comprised of software that is stored on a software storage medium. Examples of a software storage medium include magnetic disks, optical disks, or integrated circuits. Both the provider agent 100 and the API 110 are executed by a microprocessor system. The microprocessor system could be comprised of a single microprocessor or a configuration of related microprocessors. The microprocessor system could be housed in many devices with a few examples being a computer or the telephony hub 150. In some embodiments of the invention, the provider agent is comprised of objects written in C++ code.

Figure 2:
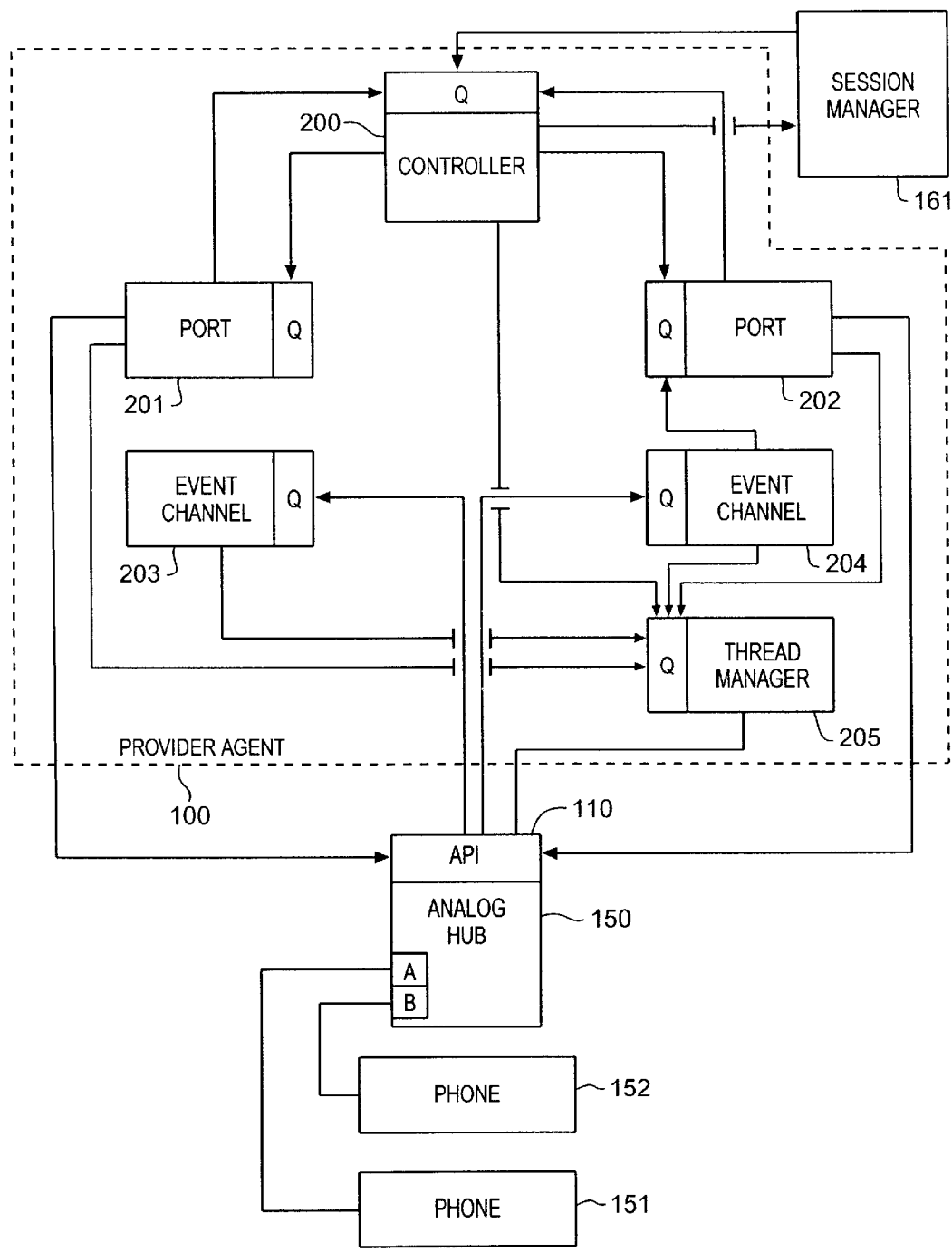
FIG. 2 is a block diagram of a software architecture in some examples of the invention.
Figure 3:
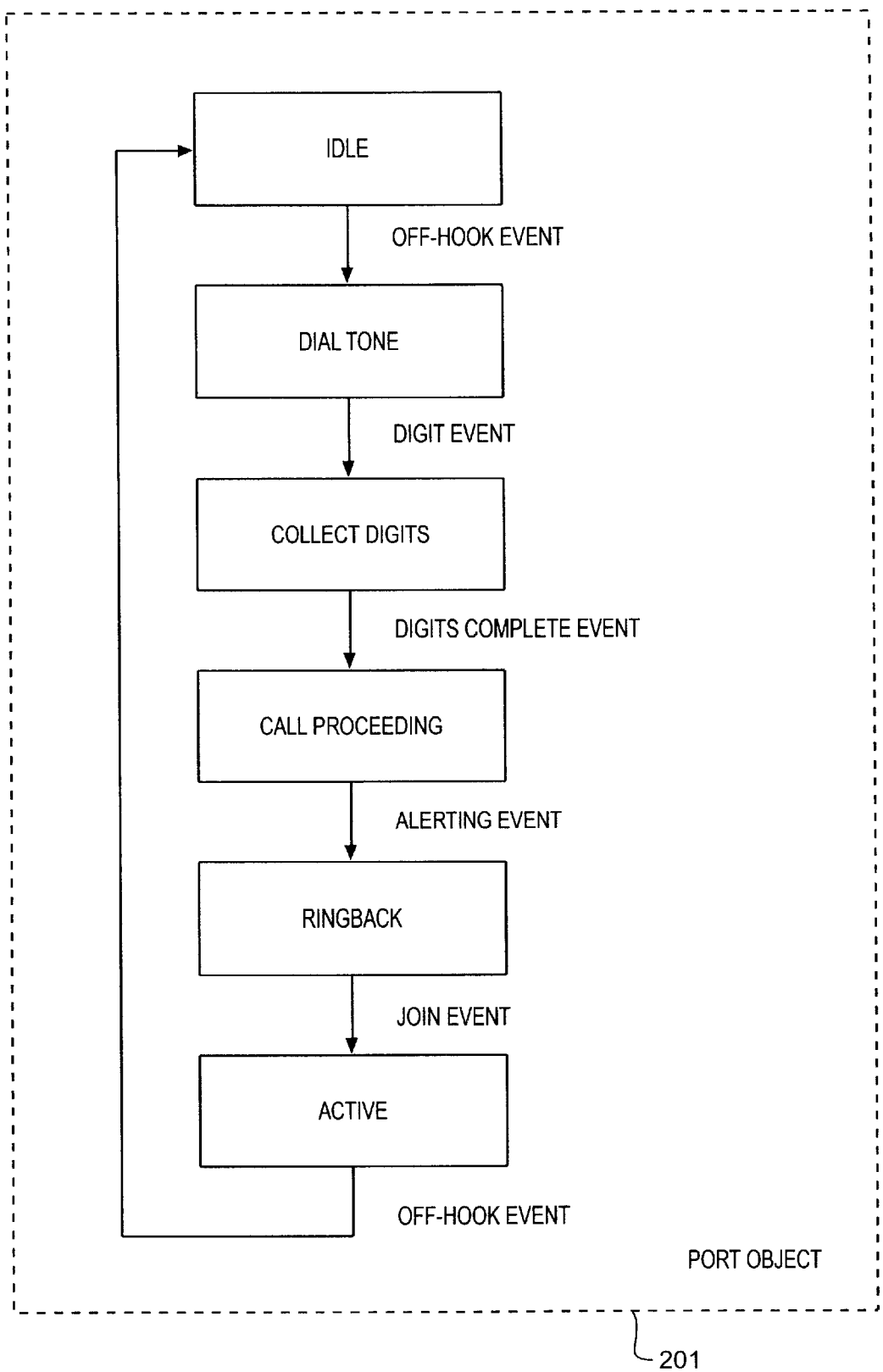
FIG. 3 is a port object state machine diagram for some examples of the invention.

Software Architecture—FIGS. 2–3

FIG. 2 depicts one example of a software architecture for the provider agent 100. The provider agent 100, the API 110, the telephony hub 150, the phones 151–152, and session manager 161 are shown as in FIG. 1 and operate as discussed above. The provider agent 100 is comprised of the following software objects: a controller object 200, port objects 201–202, event objects 203–204, and a thread manager object 205. The port object 201 and the event object 203 are associated with channel A. The port object 202 and the event object 204 are associated with channel B. The telephony hub 150 will typically have many more channels than can be shown with clarity on FIG. 2. The provider agent 100 would include a phone port object and an event channel object for each channel in the telephony hub 150. The software objects 200–205 are executed by a multi-threaded processing system with each object having its own thread. Each object also has a queue that is indicated on FIG. 2 by the letter "Q". The queue is the software component that receives and buffers messages for the object.

The controller object 200 communicates with the session manager 161 and the port objects 201–202. Communications with the session manager 161 are comprised of the following messages:

Start Service—a message to the session manager that initially identifies the service requested and includes an access key, a service ID, and user information.

Reference Information—a message from the session manager that includes session ID, party ID, and a secret ID.

Invite—a message that requests a telephony session and includes the dialed number(s).

Reply—a message that responds to an Invite message and indicates alerting, busy, or reject.

Join—a message that indicates that the party is ready to join the session.

Add Stream—a message to the session manager that requests a connection to be established to another party and that includes the terminal ID, the Party ID and the Virtual Path (VP)/Virtual Connection (VC).

Join Stream—a message from the session manager that requests a party to attach to a connection from another party.

Confirm—a message that is sent or received by the provider agent and that indicates that an ATM network connection has been made.

Terminate—a message that is sent or received by the provider agent and that indicates that the session is over.

The controller object 200 encapsulates data that associates each channel with a telephone number. The association can be modified by the user or by the network. When a message from the session manager 161 indicates an incoming call, the controller object 200 obtains the called telephone number from the message and retrieves the associated channel ID and phone port object ID from the data structure.

The controller object encapsulates call related information by generating call record objects that are identified by session ID and channel ID. The controller object 200 stores data indicating the idle or busy status of each channel. The controller object 200 includes an internal data structure for any desired call-handling policies. Call handling policies include rules for call waiting, voice mail, and call blocking. These policies can be varied based on the caller's number, the time of day, or other factors.

The port objects 201–202 are state machines. FIG. 3 depicts one example of a state machine for the port object 201 in block diagram form. The initial state is Idle. An off-hook event for channel A moves the port object 201 to the dial tone state and an instruction to provide dial tone is provided to the telephony hub 150. A digit event for channel A moves the port object 201 to the collect digits state and an instruction to stop dial tone is provided to the telephony hub 150. The port object 201 creates a digit collection object. Digits that are collected by the telephony hub 150 are provided to the digit collection object for analysis. The digit collection object determines the type of number dialed, such as emergency numbers, seven-digit numbers, ten-digit numbers, and international numbers. The digit collection object instructs the port object 201 when digit collection is complete. A digits complete event for channel A moves the port object 201 to the call proceeding state and the port object 201 instructs the controller object 200 to send Start Service and Invite messages to the session manager 161. An alerting indication from the controller object 200 moves the port object 201 to the ringback state where a ringback instruction is provided to the telephony hub 150. The alerting event is based on a reply message from the session manager 161. A join event from the controller object 200 moves the port object 201 to the active state where the session is conducted. The join event is based on a join message from the session manager 161. An on-hook event for channel A moves the port object 201 back to the idle state and results in a termination message being sent by the controller object 200 to the session manager 161.

A few deviations from the above-described state machine should be appreciated. If the reply message had a busy indication, a busy state would be entered instead of the ringback state, and a busy tone instruction would be provided to the telephony hub 150. If the reply message had a reject indication, a fast-busy state would be entered instead of the ringback state and a fast-busy tone instruction would be provided to the telephony hub 150. In both of the above cases, an on-hook event moves the port object 201 back to the idle state.

When receiving a call, the state machine is much simpler. In the idle state, an invite indication from the controller object 200 moves the port object 201 to the ring state where the telephony hub is instructed to ring channel A. The invite indication is based on an invite message from the session manager 161 that contains a telephone number that the provider agent associates with channel A. An off-hook event for channel A moves the port object 201 to that active state, until an on-hook event moves the port object 201 back to the idle state.

Referring back to FIG. 2, the event objects 203–204 track the events for each respective channel and indicate the events to the respective port objects 201–202. The event object 203 can process events using a different thread than the port object 201, and the event object 204 can process events using a different thread than the port object 202. Multi-threaded processing in this manner has advantages. Multi-threading simplifies system design and is more efficient than a single-threaded system. Multi-threading allows multiple threads to be processed in various states at the same time without the entire system waiting for a single input.

The API 110 utilizes a messaging format comprised of an instruction followed by variables in parentheses. The primary instructions are:

start ring (channel ID)
stop ring (channel ID)
start tone (channel ID, tone type)
stop tone (channel ID, tone type)
wait event (channel ID, event type)
event (channel ID, event type, value)
open voice channel (channel ID, VPI/VCI)
close voice channel (channel ID, VPI/VCI)

In the above messages, the channel ID identifies the relevant channel of the telephony hub 150. The tone types are dial tone, ringback, busy, and fast-busy. The event types are off-hook, on-hook, and digit. The value is the value of the digit. The VPI/VCI identifies the Virtual Path and Virtual Channel used by the telephony hub 150 for the session.

The thread manager object 205 provides fault tolerance for software failures and certain hardware failures. The thread manager object 205 continuously receives heartbeat messages from the objects 200–204. If a heartbeat message is not received as expected, the thread manager object 205 identifies and attempts to restart the affected thread. If the heartbeat is still absent, the thread manager object 205 instructs the telephony hub 150 to use conventional fail-over analog telephone service for the channel with the malfunctioning thread.

Figure 4:
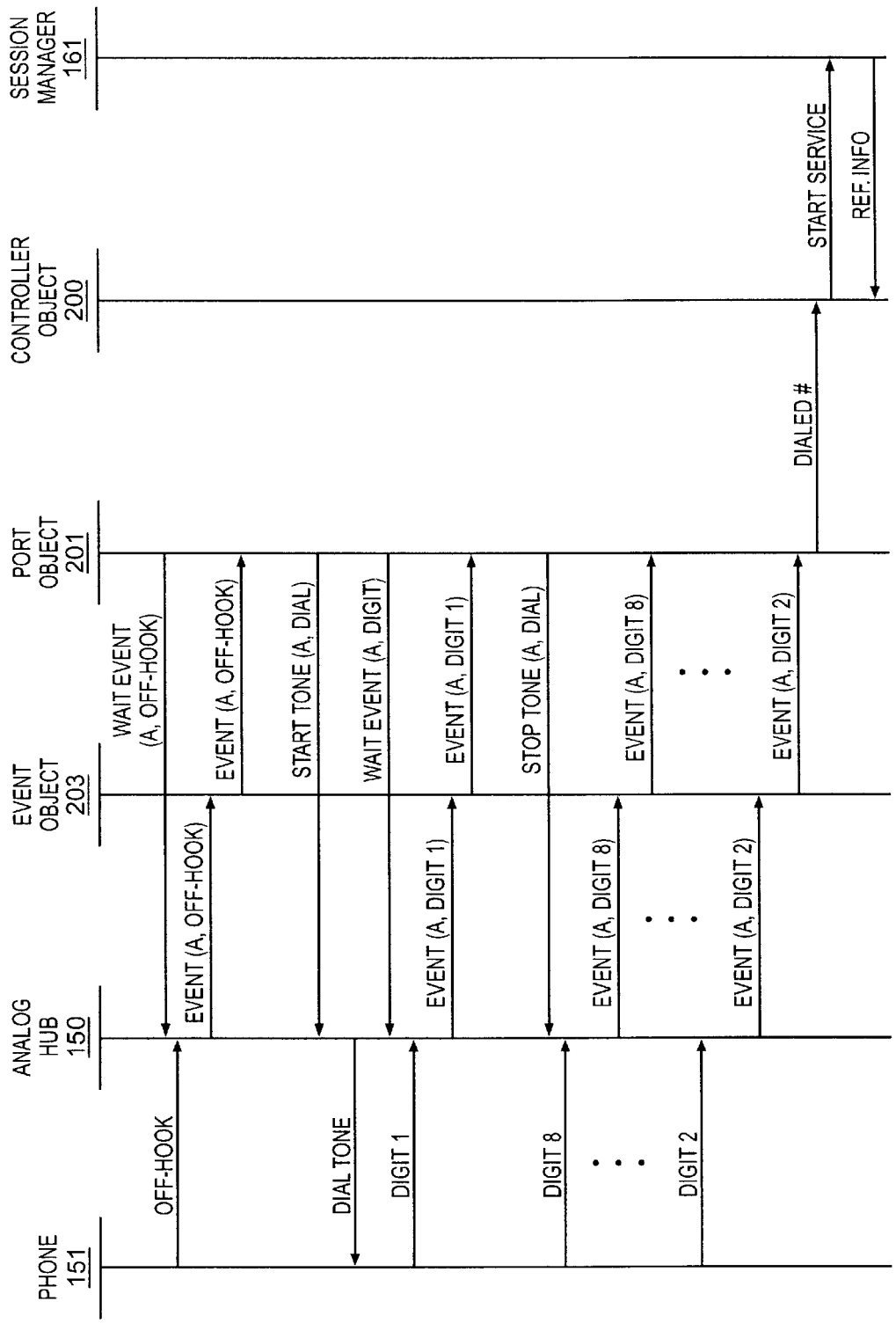
FIGS. 4–6 are message sequence charts for some examples of the invention.
Figure 5:
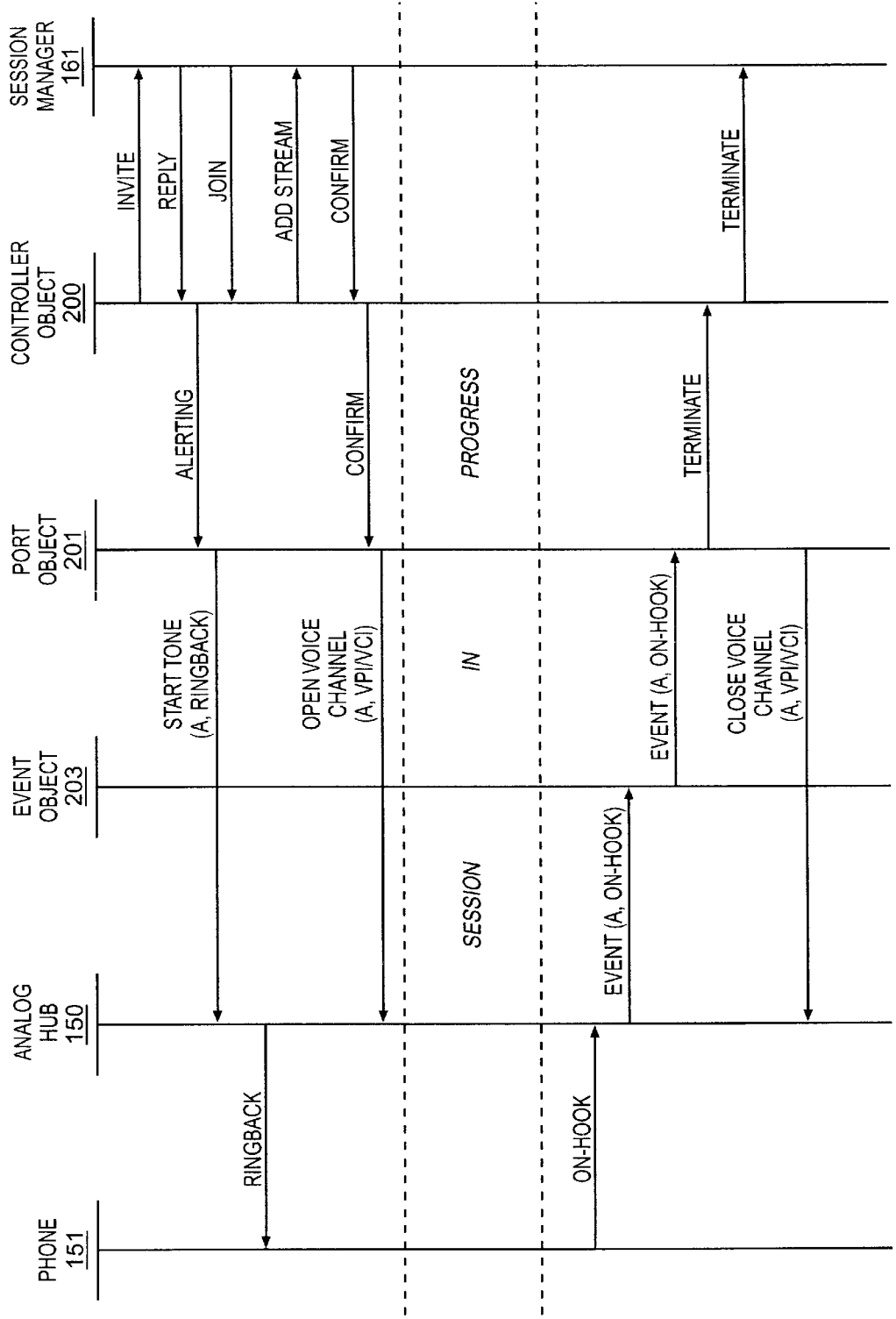
Figure 6:
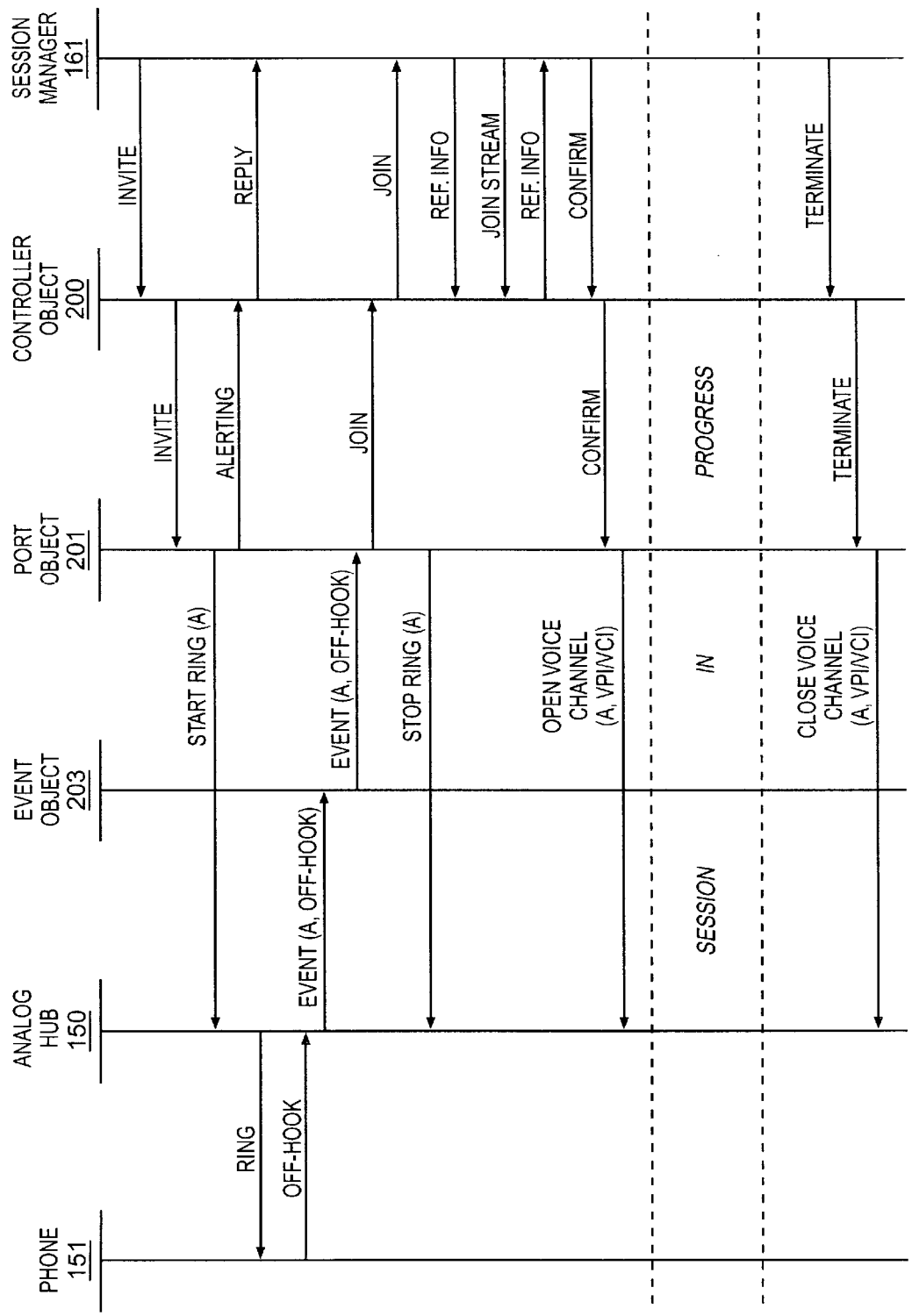

System Operation—FIGS. 4–6

FIGS. 4–6 depict a message sequence chart for operative examples of the invention, but the invention is not restricted to these examples. FIGS. 4 and 5 depict a call that originates and terminates at the phone 151. On FIG. 4, the port object 201 sends "wait event (A, off-hook)" to the telephony hub 150. When the user places a call by taking the phone 151 off-hook, the telephony hub 150 detects the off-hook event and transmits "event (A, off-hook)" to the event object 203. Messages between the telephony hub 150 and the event object 203 or the port object 201 utilize the API 110. The event object 203 provides an off-hook indication to the port object 201. The port object 201 moves from the idle state to the dial tone state and responds to the telephony hub 150 with the messages "start tone (A, dial)" and "wait event (A, digit)". The port object 201 also generates an instance of a digit collection object to process subsequently collected digits.

The user inputs a called number using the telephone 151. The user inputs a called number using the telephone 151. The telephony card 150 detects the digits and forwards the values to the event object 203. For a called number of 1-800-555-2222, the messages "event (A, digit, 1)" and "event (A, digit, 8)" would be used for the first two dialed digits, and the message "event (A, digit, 2)" would be used for the last dialed digit. The event object 203 provides a digit indication to the port object 201. After the first digit, the port object 201 moves from the dial tone state to the digits state and sends "stop tone (A, dial)" to the telephony hub 150. In response, the telephony hub 150 stops the dial tone on channel A. The port object 201 also processes the digit values with the digit collection object.

The digit collection object determines that the formatting of the called number is correct and that digit collection is complete. The digit collection object indicates to the port object 201 that digit collection is complete and provides the called number. In response to the digits complete message, the port object 201 moves from the digits state to the call proceeding state and indicates a request for telephony service with the dialed number to the controller object 200.

The controller object 200 generates and transmits a Start Service message requesting telephone service to the session manager 161. The session manager responds with reference information such as the session ID, the party ID, and a secret ID. On FIG. 5, the controller object 200 generates and transmits an invite message with the dialed number to the session manager 161. The session manager 161 typically sets-up the session and returns a reply message to the controller object 200 indicating that the called party is being alerted. Alternatively, the called party might be busy or might reject the session.

If an alerting indication is received in the reply message, the controller object 200 indicates the alerting condition to the port object 201, and the port object moves to the ringback state. The port object 201 sends "start tone (A, ringback)" to the telephony hub 150. In response, the telephony hub 150 puts a ringback tone on channel A to emulate a ringing phone at the far end.

When the party at the far end accepts the invitation, the session manager 161 sends a Join message to the controller object 200. In response, the controller object 200 generates and transmits an add stream message to the session manager 161 with the terminal ID, the party ID, and the VPI/VCI. The session manager 161 sends a Confirm message to the controller object 200 and the controller object 200 sends a confirm indication to the port object 201. In response to the confirm indication, the port object 201 sends "open voice channel (A, VPI/VCI)" to the telephony hub 150. In response to the open voice channel message, the telephony hub 150 stops the ringback tone and interworks the analog telephony signal on channel A with the ATM signal on the VPI/VCI. At this point, the session is in progress and the telephone call can proceed.

The session ends when the user places the phone 151 on-hook. The telephony hub 150 sends "event (A, on-hook)" to the event object 203 which indicates the on-hook to the port object 201. The port object 201 indicates the termination status to the controller object 200 and sends "close voice channel (A, VPI/VCI)" to the telephony hub 150. The telephony hub 150 ceases to interwork channel A with the VPI/VCI. The controller object 200 generates and transmits a Terminate message to the session manager 161.

FIG. 6 depicts a call that is placed to the phone 151 by another party and that is terminated by the other party. The controller object 200 first receives an Invite message with a session ID and dialed number from the session manager 161. The controller object 200 determines the phone port object and channel associated with the telephone number. The controller object 200, based on its call-handling policy, determines any special actions to take regarding the call. In this example, the call is routed to channel A. The controller object 200 indicates the invitation to the port object 201, and the port object 201 sends "start ring (A)" to the telephony hub 150. The telephony hub begins to ring the phone 151. The controller object 200 sends a reply message back to the session manager 161 indicating that the user is being alerted. In the alternative, the reply message sent to the session manager 161 could indicate that the phone 151 was busy or that the session was rejected.

When the user takes the phone 151 off-hook to answer the call, the telephony hub 150 sends "event (A, off-hook)" to the event object 203 which indicates the off-hook to the port object 201. The port object 201 sends "stop ring (A)" to the telephony hub 150 which stops the ringing. The port object 201 informs the controller object 200 that the user has joined the session and the controller object 200 sends a join message to the session manager 161.

The session manager 161 sends reference information to the controller object 200 indicating the session ID, party ID, and secret ID. The session manager 161 also sends a Join Stream message to the controller object 200. In response, the controller object 200 generates and transmits reference information to the session manager 161 with the terminal ID, the party ID, and the VPI/VCI. The session manager 161 sends a Confirm message to the controller object 200 and the controller object 200 sends a confirm indication to the port object 201. In response to the confirm indication, the port object 201 sends "open voice channel (A, VPI/VCI)" to the telephony hub 150. At this point, the session manager 161 has the information to set-up the connection. Subsequently, the session is in progress and the telephone call can proceed.

The session ends when a termination message is received by the controller object 200 from the session manager 161. The controller object 200 indicates the termination status to the port object 201 which sends "close voice channel (A, VPI/VCI)" to the telephony hub 150. The telephony hub 150 ceases to interwork channel A with the VPI/VCI.

It should be appreciated that various combinations of call origination and termination can occur in the context of the invention. For example the phone 151 can originate a call or receive a call. Likewise, the phone 151 can terminate a call or the called party can terminate a call. It should also be appreciated that the port object 202 and the event object 204 operate in a similar fashion to the port object 201 and the event object 203 respectively. Using these objects, the provider agent can handle multiple sessions at the same time. A provider agent can have numerous such objects, but only two groups are shown for purposes of clarity.

Race conditions exist when improper events occur given the current state of the port objects 151–152. This typically occurs when calls are incoming and outgoing at the same moment. One example is where an invite message is received by the controller object 200, and the controller object 200 determines that the status of channel A is idle, but in reality, the port object 201 is already in the dial tone state due to an off-hook event. The port object 201 will receive an invite indication from the controller object 200 when it expects to receive digit indications from the event object 203. In this case, the port object 201 must instruct the controller object 200 to reply busy or reject, and to set channel A status to busy.

In another example, the controller object 200 may receive an invite message from the session manger 161, but before the phone 151 rings, the phone 151 goes off-hook. The port object 201 will receive an invite indication from the controller object 200 and an off-hook event from the telephony hub 150. In this case, the port object 201 instructs the telephony hub 150 to open the voice channel and VPI/VCI for the incoming call as if the phone was answered for that call.

Figure 7:
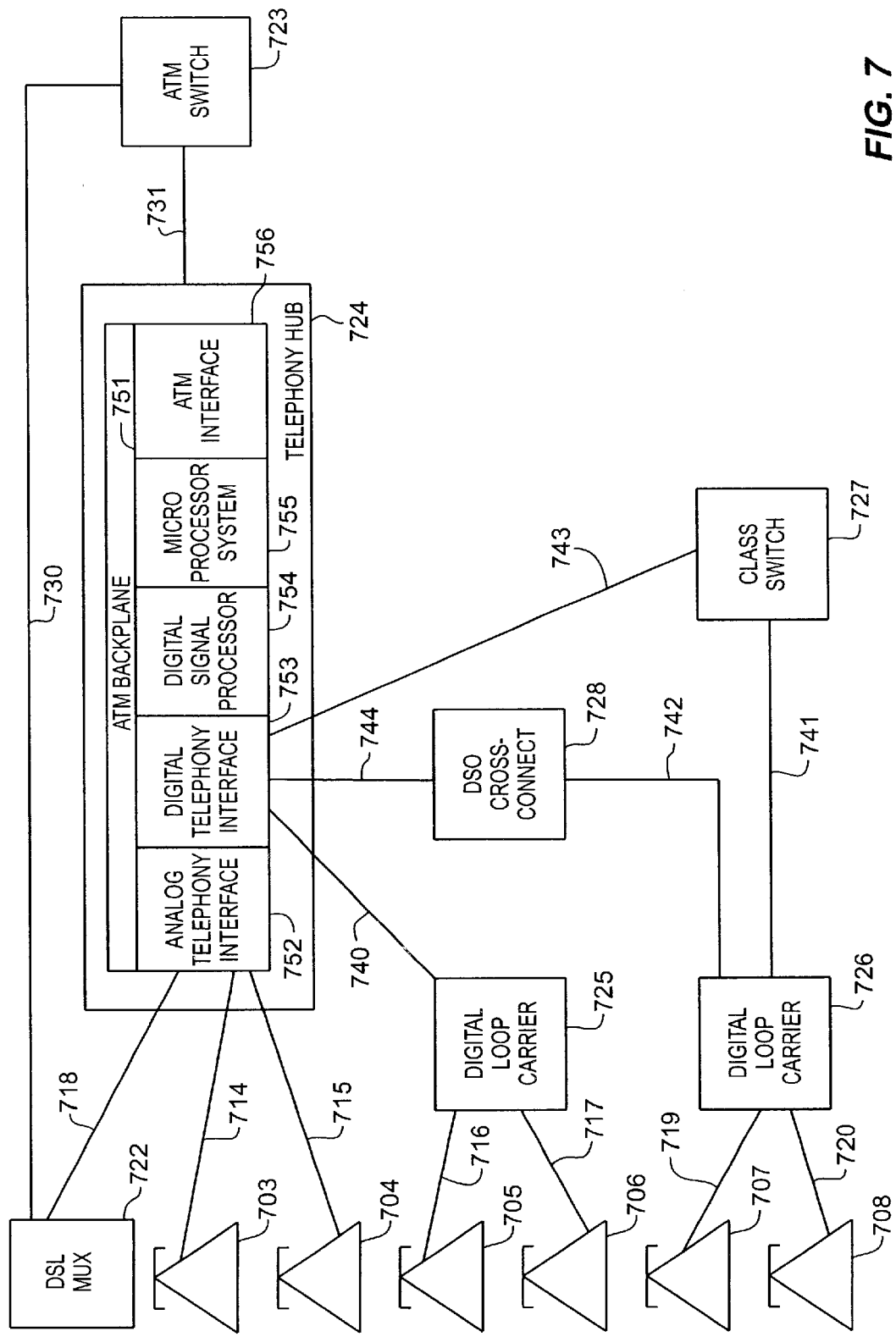
FIG. 7 is a block diagram of an telephony hub in some examples of the invention.

The Telephony Hub—FIG. 7

FIG. 7 depicts a version of the telephony hub 724, but other versions that support the invention are possible. The telephony hub 724 is shown connected to only a few telephones for reasons of clarity, but the telephony hub 724 is typically connected to approximately 200 phones on 200 channels. The telephones 703 and 704 are connected to the telephony hub 724 by connections 714 and 715 respectively. The telephony hub 724 is connected to the ATM switch 723 by connection 731. The DSL mux 722 is connected to the telephony hub 724 by connection 718. The telephones 705 and 706 are connected to the DLC 725 by connections 716 and 717 respectively. The DLC 725 is connected to the telephony hub 724 by connection 740. The telephones 707 and 708 are connected to the DLC 726 by connections 719 and 720 respectively.

The DLC 726 is connected to the class 5 telephone switch 727 by connection 741 and is connected to the DS0 cross-connect 728 by connection 742. The class 5 telephone switch 727 is connected to the telephony hub 724 by connection 743. The DS0 cross-connect 728 is connected to the telephony hub 724 by connection 744.

The telephones 703–708 are conventional communications devices that use the analog telephony format. The connections 714–720 are any medium operational to carry analog telephony signals, and the connections 714–720 are typically twisted pairs of copper wires.

The ATM/DSL format is a DSL signal that transports ATM cells as the high-bandwidth data. The DSL mux 722 is a device that interworks the ATM/ADSL format with an ATM/broadband format. The ATM/broadband format is a broadband signal that transports ATM cells. Synchronous Optical Network (SONET) is a popular broadband format, and the ATM/SONET format is well known. Preferably, the DSL mux 722 includes redundant OC-3 network interfaces and handles up to 255 residences on the access side. The DSL mux 722 should be able to differentiate data from voice. In some embodiments, the DSL mux 722 could be adapted to provide Switched Virtual Circuits (SVCs) to the ATM switche 723. The DSL mux 722 could be adapted from the DSL product provided by Westell.

The ATM switch 723 is able to establish SVCs and Permanent Virtual Circuits (PVCs). The ATM switch 723 is conventional such as the Vector switch supplied by Nortel. The connection 731 carries the ATM/broadband format. In some embodiments the connection 731 carries the ATM/SONET format. For example, the connection 731 could be comprised at least in part of a Broadband Metropolitan Area Network (BMAN) that uses a 4-fiber, bi-directional, line switched, self-healing, OC-3 SONET ring.

The DLC 725 and the DLC 726 provide an analog telephony interface to the telephones 705–708. The DLCs 725 and 726 provide a digital interface to the telephony hub 724. The DLCs 725 and 726 are conventional devices that operates in accord with Bellcore TR-303.

The class 5 telephone switch 727 and the DS0 cross-connect 728 are both conventional devices that are well-known in the art. The connections 740–744 are conventional TDM connections. The class 5 telephone switch 727 could be in another network, and the analog hub 724 could route local calls to the other network through the class 5 telephone switch 727.

There are various ATM connectivity options between the ATM switch 723 and the telephony hub 724. The connection 731 could be comprised PVCs, SVCs, or a combination of PVCs and SVCs. For example, low bandwidth control channels could be provisioned directly from the telephony hub 724 to the ATM switch 723, but higher bandwidth user channels could be established on an SVC basis.

The telephony hub 724 provides an analog telephony interface to the telephones 703 and 704. The telephony hub 724 provides a digital telephony interface to the telephones 705–708 through the DLC 725 and the DLC 726. The telephony hub 724 provides an ATM interface to the ATM switch 723. The telephony hub 724 executes provider agent software that directs system operation. The telephony hub 724 could be adapted from the LDR-2000 supplied by Yurie Systems.

The telephony hub 724 includes an ATM backplane 757 that interconnects an analog telephony interface 752, a digital telephony interface 753, a Digital Signal Processor (DSP) 754, a microprocessor system 755, and the ATM interface 756. Under control of a provider agent, the analog telephony interface 752 uses the analog telephony format to communicate with the telephones 703 and 704. Under control of the provider agent, the digital telephony interface uses the digital telephony format to communicate with the DLC 725, the DS0 cross-connect 728, and the class 5 telephone switch 727.

The DSP 754 provides echo cancellation, facsimile emulation, and modem emulation. Modem and facsimile calls can be routed to the DSP 754. The DSP 754 interworks the modem or fax communication from the connections 714, 715, 718, 740, 743, and 744 with a Variable Bit Rate (VBR) ATM format, such as ATM Adaption Layer 5 (AAL5). AAL 5 saves bandwidth over the Constant Bit Rate AAL 1 used for voice calls.

The microprocessor system 755 executes the provider agent. The provider agent directs the analog telephony interface 752 and the digital telephony interface 753 to communicate with the telephones 703–708 using the conventional analog and digital telephony formats. The provider agent directs the analog telephony interface 752 and the digital telephony interface 753 to interwork the analog and digital telephony signals with ATM signals for the ATM interface 756. The provider agent directs the analog telephony interface 752 and the digital telephony interface 753 to route selected call through the DSP 754. In some embodiments, the analog telephony interface 752 can provide analog telephony service to the DSL mux 722 over connection 718.

The invention is not restricted to basic telephone service. A subscription/configuration service could also be deployed. The provider agent would analyze the called number to determine if telephone service or the subscription/configuration service is requested. The provider agent would then direct the telephony card to couple the call to the requested service. Other services could be implemented in a similar fashion.

Those skilled in the art can appreciate variations of the above-described embodiments that fall within the scope of the invention. As a result, the invention is not limited to the specific embodiments discussed above, but only by the following claims and their equivalents.

What is claimed is:

1. A method of operating a provider agent software interface between an telephony hub and a session manager, wherein the telephony hub is operational to interwork between telephony signals over a plurality of channels and Asynchronous Transfer Mode (ATM) signals over a plurality of ATM virtual connections in response to interwork instructions, wherein the telephony hub is operational to detect on-hook events, off-hook events, and digit events and to provide event messages, wherein the telephony hub is operational to provide dial tone, ringback, and busy signals in response to tone instructions, wherein the session manager is operational to transmit and receive invite messages, reply messages, join messages, confirm messages, and terminate messages, the method comprising:

(a) receiving an off-hook event message for a channel from the telephony hub, and in response, transmitting a dial tone instruction for the channel to the telephony hub;

(b) receiving a plurality of digit event messages for the channel from the telephony hub, and in response, transmitting an invite message indicating a dialed number for the channel to the session manager;

(c) receiving a reply message for the channel from the session manager indicating an alerting condition, and in response, transmitting a ringback tone instruction for the channel to the telephony hub;

(d) receiving a join message for the channel from the session manager, and in response, transmitting an add stream message for the channel to the session manager;

(e) receiving a confirm message for the channel from the session manager, and in response, transmitting an interwork instruction for the channel to the telephony hub to interwork a telephony signal on the channel with an ATM signal on a selected virtual channel for the channel; and (f) repeating steps (a), (b), (c), (d), and (e) for at least 100 additional channels.

2. The method of claim 1 further comprising after step (e):

(g) transmitting a second interwork instruction for the channel to the telephony hub to stop interworking the channel and the selected virtual channel;

(h) after step (g), receiving another invite message for the channel from the session manager, and in response, determining that the invite message is associated with the channel, transmitting a ring instruction for the channel to the telephony hub, and transmitting another reply message indicating an alerting condition for the channel to the session manager;

(i) receiving another off-hook event message for the channel from the telephony hub, and in response, transmitting another join message for the channel to the session manager;

(j) receiving a join stream message for the channel from the session manager, and in response, transmitting a reference information message for the channel to the session manager;

(k) receiving a confirm message for the channel from the session manager, and in response, transmitting a third interwork instruction for the channel to the telephony hub to interwork another telephony signal on the channel with another ATM signal on another selected virtual channel for the channel; and (l) repeating steps (g), (h), (i), (j) and (k) for at least 100 additional channels.

3. The method of claim 2 wherein step (g) further comprises receiving an on-hook event message for the channel from the telephony hub, and in response, transmitting a terminate message for the channel to the session manager and transmitting the second interwork instruction for the channel.

4. The method of claim 2 wherein step (g) further comprises receiving a termination message for the channel from the session manager, and in response, transmitting the second interwork instruction for the channel.

5. The method of claim 1 wherein the provider agent is comprised of a plurality of objects and wherein the provider agent is executed by a multithreaded processing system and the objects each have a separate processing thread.

6. The method of claim 1 wherein the provider agent and the telephony hub communicate through an application programming interface that is specified in an Interface Definition Language (IDL) of a Common Object Request Broker Architecture (CORBA).

7. The method of claim 1 wherein determining that the invite message is associated with the channel in step (h) further comprises associating the called number in the invite message with the channel.

8. A method of operating a provider agent software interface between an telephony hub and a session manager, wherein the telephony hub is operational to interwork between telephony signals over a plurality of channels and Asynchronous Transfer Mode (ATM) signals over a plurality of ATM virtual connections in response to interwork instructions, wherein the telephony hub is operational to detect on-hook events, off-hook events, and digit events and to provide event messages, wherein the telephony hub is operational to generate dial tone, ringback, and busy signals in response to tone instructions, wherein the session manager is operational to transmit and receive invite messages, reply messages, join messages, confirm messages, and terminate messages, the method comprising:

(a) in a first event object, receiving an off-hook event message for a first channel from the telephony hub, and in response, transmitting an off-hook indication for the first channel to a first port object;

(b) in the first port object, receiving the off-hook indication for the first channel, and in response, transmitting a dial tone instruction for the first channel to the telephony hub;

(c) in the first event object, receiving a plurality of digit event messages for the first channel from the telephony hub, and in response, transmitting a plurality of digit indications for the first channel to the first port object;

(d) in the first port object, receiving the digit indications for the first channel, and in response, transmitting a dialed number indication for the first channel to a controller object;

(e) in the controller object, receiving the dialed number indication for the first channel, and in response, transmitting an invite message for the first channel to the session manager;

(f) in the controller object, receiving a reply message for the first channel from the session manager indicating an alerting condition, and in response, transmitting an alerting indication for the first channel to the first port object;

(g) in the first port object, receiving the alerting indication for the first channel, and in response, transmitting a ringback tone instruction for the first channel to the telephony hub;

(h) in the controller object, receiving a join message for the first channel from the session manager, and in response, transmitting an add stream message for the first channel to the session manager;

(i) in the controller object, receiving a confirm message for the first channel from the session manager, and in response, transmitting a confirm indication for the first channel to the first port object; and (j) in the first port object, receiving the confirm indication for the first channel, and in response, transmitting a first interwork instruction for the first channel to the telephony hub to interwork a telephony signal on the first channel and with an ATM signal on a selected virtual channel for the first channel.

9. The method of claim 8 wherein the software interface is executed by a multithreaded processing system and the controller object, the first port object and the first event object each have a separate processing thread.

10. The method of claim 8 wherein the first event object and the telephony hub communicate through an application programming interface that is specified in an Interface Definition Language (IDL) of a Common Object Request Broker Architecture (CORBA).

11. The method of claim 8 further comprising:

(k) in the controller object, transmitting a controller object heartbeat signal at regular intervals;

(l) in the first port object, transmitting a first port object heartbeat signal at regular intervals;

(m) in the first event object, transmitting a first event object heartbeat signal at regular intervals; and (n) in a thread manager, receiving the heartbeat signals, and in response, transmitting a switch-over signal if at least a portion of the heartbeat signals are not received.

12. The method of claim 8 further comprising after step (j):

(k) in the first event object, receiving an on-hook event message for the first channel from the telephony hub, and in response, transmitting an on-hook indication for the first channel to the first port object;

(l) in the first port object, receiving the on-hook indication for the first channel, and in response, transmitting a terminate indication for the first channel to the controller object and transmitting a second interwork instruction for the first channel to the telephony hub to stop interworking the first channel and the selected virtual channel for the first channel; and (m) in the controller object, receiving the terminate indication for the first channel, and in response, transmitting a terminate message for the first channel to the session manager.

13. The method of claim 8 further comprising after step (j):

(k) in the controller object, receiving a termination message for the first channel from the session manager, and in response, transmitting a termination indication for the first channel to the first port object; and (l) in the first port object, receiving the termination indication for the first channel, and in response, transmitting a second interwork instruction for the first channel to the telephony hub to stop interworking the first channel and the selected virtual channel for the first channel.

14. The method of claim 8 further comprising:

(k) in a second event object, receiving an off-hook event message for a second channel from the telephony hub, and in response, transmitting an off-hook indication for the second channel to a second port object;

(l) in the second port object, receiving the off-hook indication for the second channel, and in response, transmitting a dial tone instruction for the second channel to the telephony hub;

(m) in the second event object, receiving a plurality of digit event messages for the second channel from the telephony hub, and in response, transmitting a plurality of digit indications for the second channel to the second port object;

(n) in the second port object, receiving the digit indications for the second channel, and in response, transmitting a dialed number indication for the second channel to a controller object;

(o) in the controller object, receiving the dialed number indication for the second channel, and in response, transmitting an invite message for the second channel to the session manager;

(p) in the controller object, receiving a reply message for the second channel from the session manager indicating an alerting condition, and in response, transmitting an alerting indication for the second channel to the second port object;

(q) in the second port object, receiving the alerting indication for the second channel, and in response, transmitting a ringback tone instruction for the second channel to the telephony hub;

(r) in the controller object, receiving a join message for the second channel from the session manager, and in response, transmitting an add stream message for the second channel to the session manager;

(s) in the controller object, receiving a confirm message for the second channel from the session manager, and in response, transmitting a confirm indication for the second channel to the second port object; and (t) in the second port object, receiving the confirm indication for the second channel, and in response, transmitting a second interwork instruction for the second channel to the telephony hub to interwork a telephony signal on the second channel with an ATM signal on a selected virtual channel for the second channel.

15. The method of claim 8 further comprising:

(k) in the controller object, receiving an invite message from the session manager and determining that the invite message is associated with a second channel, and in response, transmitting an invite indication for the second channel to a second port object;

(l) in the second port object, receiving the invite indication for the second channel, and in response, transmitting an alerting indication for the second channel to the controller object and transmitting a ring instruction for the second channel to the telephony hub;

(m) in the controller object, receiving the alerting indication for the second channel from the second port object, and in response, transmitting a reply message indicating an alerting condition for the second channel to the session manager;

(n) in a second event object, receiving an off-hook event message for the second channel from the telephony hub, and in response, transmitting an off-hook indication for the second channel to the second port object;

(o) in the second port object, receiving the off-hook indication for the second channel, and in response, transmitting a join indication for the second channel to the controller object;

(p) in the controller object, receiving the join indication for the second channel from the second port object, and in response, transmitting a join message for the second channel to the session manager;

(q) in the controller object, receiving a join stream message for the second channel from the session manager, and in response, transmitting a reference information message for the second channel to the session manager;

(r) in the controller object, receiving a confirm message for the second channel from the session manager, and in response, transmitting a confirm indication for the second channel to the second port object; and (s) in the second port object, receiving the confirm indication for the second channel, and in response, transmitting a second interwork instruction for the second channel to the telephony hub to interwork a telephony signal on the second channel with an ATM signal on a selected virtual channel for the second channel.

16. A provider agent product that includes software objects for execution in a microprocessor system to provide an interface between an telephony hub and a session manager, wherein the telephony hub is operational to interwork between telephony signals over a plurality of channels and Asynchronous Transfer Mode (ATM) signals over a plurality of ATM virtual connections in response to interwork instructions, wherein the telephony hub is operational to detect on-hook events, off-hook events, and digit events and to provide event messages, wherein the telephony hub is operational to provide dial tone, ringback, and busy signals in response to tone instructions, wherein the session manager is operational to transmit and receive invite messages, reply messages, join messages, confirm messages and terminate messages, the provider agent product comprising:

a first event object that is operational to direct the microprocessor system to receive an off-hook event message for a first channel from the telephony hub and responsively transmit an off-hook indication for the first channel, and to receive a plurality of digit event messages for the first channel from the telephony hub and responsively transmit a plurality of digit indications for the first channel;

a first port object that is operational to direct the microprocessor system to receive the off-hook indication for the first channel from the first event object and responsively transmit a dial tone instruction for the first channel to the telephony hub, to receive the digit indications for the first channel from the first event object and responsively transmit a dialed number indication for the first channel, to receive an alerting indication for the first channel and responsively transmit a ringback tone instruction for the first channel to the telephony hub, and to receive a confirm indication for the first channel and responsively transmit a first interwork instruction for the first channel to the telephony hub to interwork a telephony signal on the first channel with an ATM signal on a selected virtual channel for the first channel;

a controller object that is operational to direct the microprocessor system to receive the dialed number indication for the first channel from the first port object and responsively transmit an invite message for the first channel to the session manager, to receive a reply message for the first channel from the session manager indicating an alerting condition and responsively transmit the alerting indication for the first channel to the first port object, to receive a join message for the first channel from the session manager and responsively transmit an add stream message for the first channel to the session manager, and to receive a confirm message for the first channel from the session manager and responsively transmit the confirm indication for the first channel to the first port object; and a software storage medium that is operational to store the controller object, the first port object, and the first event object.

17. The provider agent product of claim 16 wherein the software storage medium is incorporated into the analog telephony hub.

18. The provider agent product of claim 16 wherein the software storage medium is incorporated into a computer.

19. The provider agent product of claim 16 further comprising:

a second event object that is operational to direct the microprocessor system to receive an off-hook event message for a second channel from the telephony hub and responsively transmit an off-hook indication for the second channel, and to receive a plurality of digit event messages for the second channel from the telephony hub and responsively transmit a plurality of digit indications for the second channel;

a second port object that is operational to direct the microprocessor system to receive the off-hook indication for the second channel from the second event object and responsively transmit a dial tone instruction for the second channel to the telephony hub, to receive the digit indications for the second channel from the second event object and responsively transmit a dialed number indication for the second channel, to receive an alerting indication for the second channel and responsively transmit a ringback tone instruction for the second channel to the telephony hub, and to receive a confirm indication for the second channel and responsively transmit a second interwork instruction for the second channel to the telephony hub to interwork a telephony signal on the second channel with an ATM signal on a selected virtual channel for the second channel;

wherein the controller object is operational to direct the microprocessor system to receive the dialed number indication for the second channel from the second port object and responsively transmit an invite message for the second channel to the session manager, to receive a reply message for the second channel from the session manager indicating an alerting condition and responsively transmit the alerting indication for the second channel to the second port object, to receive a join message for the second channel from the session manager and responsively transmit an add stream message for the second channel to the session manager, and to receive a confirm message for the second channel from the session manager and responsively transmit the confirm indication for the second channel to the second port object; and wherein the software storage medium is operational to store the second port object and the second event object.

20. The provider agent product of claim 16 wherein:

the controller object is further operational to direct the microprocessor system to receive an invite message for a second channel from the session manager and responsively determine that the invite message is associated with the second channel and transmit an invite indication for the second channel, to receive an alerting indication for the second channel and responsively transmit a reply message indicating an alerting condition for the second channel to the session manager, to receive a join indication for the second channel and responsively transmit a join message for the second channel to the session manager, to receive a join stream message for the second channel from the session manager and responsively transmit a reference information message for the second channel to the session manager, to receive a confirm message for a second channel from the session manager and responsively transmit a confirm indication for the second channel; and further comprising:

a second port object that is operational to direct the microprocessor system to receive the invite indication for the second channel from the controller object and responsively transmit the alerting indication for the second channel to the controller object and transmit a ring instruction for the second channel to the telephony hub, to receive an off-hook indication for the second channel and responsively transmit the join indication for the second channel to the controller object, and to receive the confirm indication for the second channel from the controller object and responsively transmit a second interwork instruction for the second channel to the telephony hub to interwork the a telephony signal on the second channel with an ATM signal on a selected virtual channel for the second chancel;

a second event object that is operational to direct the microprocessor system to receive an off-hook event message for the second channel from the telephony hub and responsively transmit the off-hook indication for the second channel to the second port object; and wherein:

the software storage medium is further operational to store the second port object and the first port object.

* * * * *